Patented Feb. 8, 1944

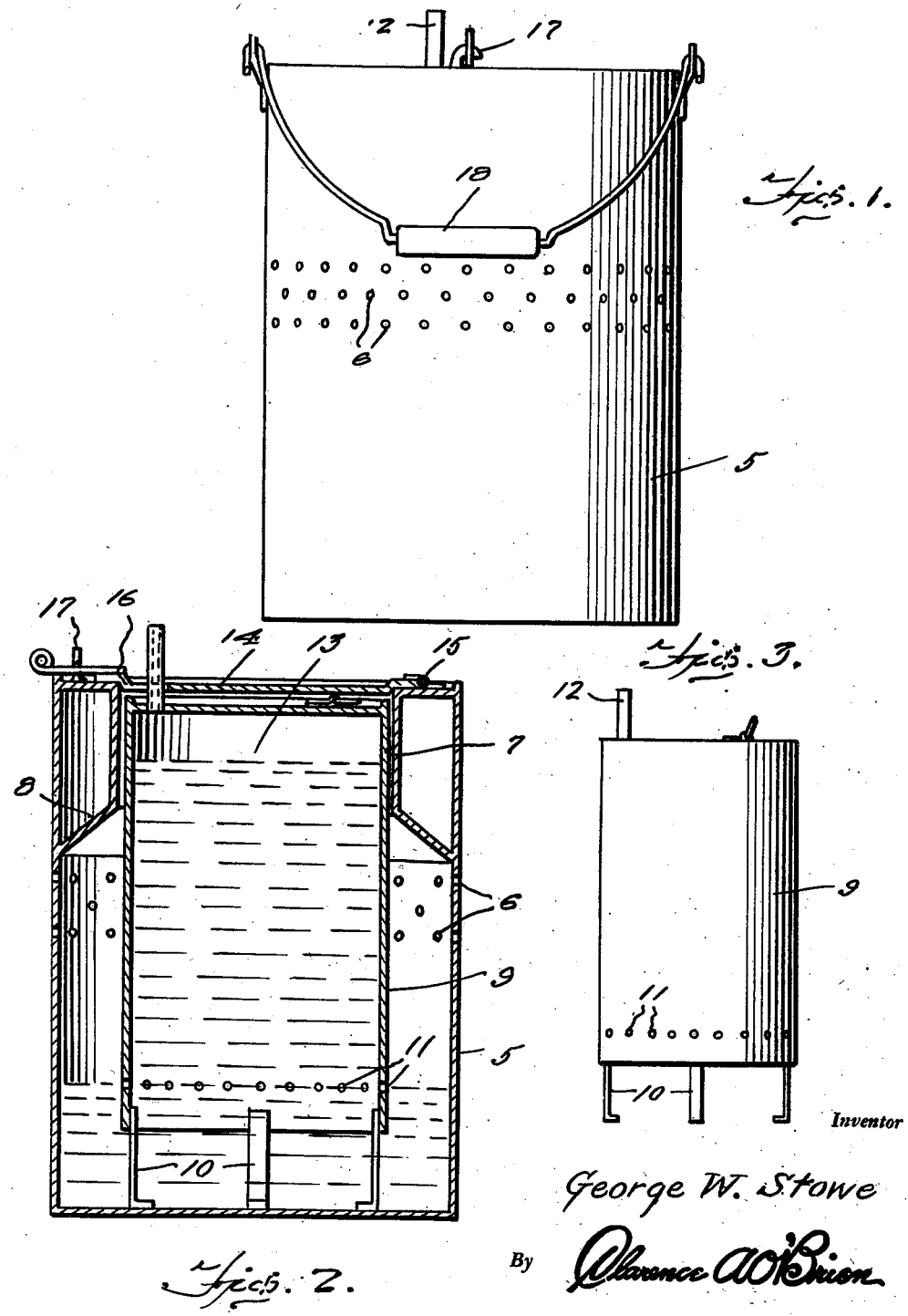

2,341,246

UNITED STATES PATENT OFFICE 2,341,246

MINNOW BUCKET

George W. Stowe, San Antonio, Tex.

Application November 8, 1941, Serial No. 418,416

1 Claim. (Cl. 43—56)

The present invention relates to new and useful improvements in minnow buckets and has for its primary object to provide means for aerating the water contained in the bucket while transporting the same.

More specifically the invention comprises an outer bucket having air inlet means therein and an inner bucket open at its bottom and having its walls spaced within the outer bucket whereby to provide an air chamber between the walls and to provide a hose connection for the top of the inner bucket whereby a hose may be attached to a suitable suction device to draw the air into the space between the inner and outer buckets and upwardly through the water contained in the inner bucket.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which:

Figure 1 is a side elevational view.

Figure 2 is a vertical sectional view, and

Figure 3 is a side elevational view of the inner bucket.

Referring now to the drawing in detail wherein for the purpose of illustration I have disclosed a preferred embodiment of the invention, the numeral 5 designates the outer bucket having one or more rows or series of perforations 6 extending at circumferentially spaced intervals around the bucket substantially midway between the top and bottom portions thereof.

An air chamber 7 extends around the inner wall of the bucket 5 adjacent the top thereof, the air chamber having a tapering bottom wall 8 which is inclined in a direction toward the wall of the bucket and terminating above the perforations 6. The top of the chamber 7 is flat and terminates slightly below the upper edge of the outer bucket 5.

Positioned in the outer bucket 5 is an inner bucket 9, the inner bucket being placed in an inverted position in the outer bucket with its open end disposed downwardly and spaced above the bottom of the outer bucket by legs 10. The side wall of the inner bucket is spaced concentrically from the wall of the outer bucket beneath the air chamber 7, and a row of perforations 11 are formed in the wall of the inner bucket adjacent the lower edge thereof, the perforations 11 being positioned below the perforations 6.

The upper end of the inner bucket 9 is closed and projecting therefrom, adjacent one edge of the inner bucket, is a nipple 12 communicating with the interior of the inner bucket and to which a hose (not shown) may be attached for connection to a suitable pump, for evacuating the air from the upper portion of the inner bucket after the buckets have been supplied with a quantity of water sufficiently to substantially fill the inner bucket and to provide an air space 13 in the upper portion thereof.

Accordingly, as air is evacuated from the air space 13, fresh air will be admitted into the perforations 6 into the air space between the inner and outer buckets from which it is drawn into the chamber 13 through the water contained in the buckets.

A lid 14 is hinged as at 15 adjacent one side of the outer bucket 5 and is provided adjacent its free edge with a notch 16 adapted to accommodate the nipple 12 when the lid is in closed position. A suitable catch 17 is provided to secure the lid in its closed position and the outer bucket 5 may also be provided with a conventional handle 18.

Having thus described the invention what I claim is:

A minnow bucket comprising an outer bucket adapted to contain water, an inverted receptacle supported in said bucket with its lower edge spaced above the bottom of the bucket and below the level of the water, a dead air chamber in the upper portion of the receptacle, the interior of said outer bucket being exposed to the atmosphere, a cover for the outer bucket, catch means for the cover and securing the receptacle against upward movement in the outer bucket, and suction means connected to said chamber for drawing the air from the outer bucket through the water and out through the chamber.

GEORGE W. STOWE.